United States Patent

[11] 3,581,559

| [72] | Inventors | Hans Deuring<br>Burscheid;<br>Hans Kling, Cologne-Lindenthal, Germany |
|---|---|---|
| [21] | Appl. No. | 828,263 |
| [22] | Filed | May 27, 1969 |
| [45] | Patented | June 1, 1971 |
| [73] | Assignee | Goetzewerke, Friedrich Goetze A. G.<br>Burscheid, Germany |

[54] METHOD AND APPARATUS FOR DETECTING FLAWS IN A SEAL
5 Claims, 5 Drawing Figs.

| [52] | U.S. Cl. | 73/105 |
|---|---|---|
| [51] | Int. Cl. | G01b 5/28 |
| [50] | Field of Search | 73/105;<br>651/459; 73/104, 105, 78, 7, 9 |

[56] References Cited
UNITED STATES PATENTS

| 2,733,598 | 2/1956 | Miner | 73/105 |
|---|---|---|---|
| 3,071,247 | 1/1963 | Paruolo et al. | 209/88 |
| 3,101,147 | 8/1963 | Fry et al. | 73/104X |
| 3,395,573 | 8/1968 | Baker et al. | 73/104 |

Primary Examiner—Richard C. Queisser
Assistant Examiner—John P. Beauchamp
Attorney—Spencer & Kaye ABSTRACT: A method and apparatus for testing for flaws on the sealing surface of a seal made of elastic material. The testing is accomplished by passing a feeler over the sealing surface to detect the existence and location of flaws by measurement of variations in the friction between the feeler and the sealing surface. According to the invention the sealing surface is stretched, at least in the region which is in contact with the feeler, to expand or enlarge the flaws.

PATENTED JUN 1 1971

3,581,559

Inventors
Hans DEURING & Hans KLING

By Spencer & Kaye

METHOD AND APPARATUS FOR DETECTING FLAWS IN A SEAL

CROSS REFERENCE TO RELATED APPLICATION

The subject of this application is related to that disclosed in the copending application of Hans Kling and Gunter Jansen, Ser. No. 651,459, filed July 6th, 1967, now abandoned.

BACKGROUND OF THE INVENTION

The present invention relates to an improvement in a method and apparatus for detecting flaws on the sealing surface of a seal made of elastic material. The test is accomplished by passing a feeler over the sealing surface and obtaining a measurement which is a function of the variation in the friction between the feeler and the sealing surface. Such a method and apparatus is disclosed in the related application referred to above. In the preferred embodiment illustrated and described in this related application the seal is a shaft ring seal on "sealing ring" and the sealing surfaces are formed by the tips of the sealing ring.

The above-described method and apparatus operate according to the principal that a varying friction between the lip surface or edge of the shaft sealing ring and a feeler may serve as a criterion for the determination of the existence and location of flaws in the sealing surface. The amount of the deviation from the normal friction is a measure of the size of the flaw.

Apparatus which operates according to this principal comprises a sensing head having a feeler needle with a tip, a mechanical force transfer member and a piezoelectric transducer. When the feeler tip is passed over a flaw, such as a small cut, in the sealing surface of a seal, it will momentarily catch or stick in the flaw and then spring forward again to its normal sliding position. This mechanical impulse originating at the feeler tip is mechanically transmitted to the piezoelectric transducer which converts it to an electrical pulse. After amplification this electrical pulse can be used to indicate the flaw, for example, by feeding it to an oscillograph.

SUMMARY OF THE INVENTION

An object of the present invention is to improve the above-described method and apparatus for detecting flaws in the surface of a seal.

More particularly, it is an object of the present invention to make easier the detection of flaws in a sealing surface in order to achieve a more accurate test.

These objects, as well as other objects which will become apparent in the discussion that follows, are achieved, according to the present invention, by stretching the sealing surface of the seal, at least in the region which is in contact with the feeler.

For example, in the case where the seal is a shaft sealing ring and the sealing surfaces are formed by the lips of the sealing ring, the tangential expansion of the circumferential region which is in instantaneous contact with the feeler tip expands any flaws in the sealing ring material which may be present at the lip edges. This expansion increases the variations in friction between the feeler and the sealing surface caused by flaws and adds to the assurance that all the flaws will be detected.

If it is desired to place the lips of the sealing ring under the same tension as will be present when the sealing ring is in operation, the entire lip edge may be expanded to the nominal or rated inner diameter of the sealing ring. It is also possible, however, to increase the inner diameter of the lip edge of the sealing ring to a value above the nominal diameter to increase the accuracy of the test.

The testing method described a above may be carried out by apparatus, according to the present invention, which has the feeler arranged in an axial groove in the circumferential surface of a shaft stump. If this shaft is made with a diameter larger than the internal diameter of the lips of the sealing ring in their unstressed state, it will expand the lips when the sealing ring is forced over its end. If the sealing ring is then turned relative to the shaft stump the feeler arranged to axial groove will be passed over the stretched sealing lip edge and the flaw detected.

The mass production of shaft sealing rings is facilitated if, according to a particular modification of the above embodiment, the shaft stump is provided with a plurality of axial grooves distributed around its circumference and a separate feeler is arranged in each groove. The feelers can then be operated to simultaneously sense for flaws in the sealing surfaces of a sealing ring. It is possible, with the above-described arrangement, to construct each feeler tip to sense a different plane of the sealing surface of a single sealing ring so that, in addition to the actual sealing edge, the adjacent sliding face surfaces of the seal can be tested as well.

On the other hand, the arrangement of a plurality of feelers distributed in grooves around the circumference of the shaft stump can also be utilized to simultaneously sense for different types or sizes of flaws. This may be accomplished by subjecting the feelers to differing test criteria during the process of sensing.

It is also possible to realize the method a according to the present invention by arranging a feeler between two "spreader rollers" and guiding the rollers along the sealing edge to be tested in such a way that they stretch the portion of the sealing edge that lies between them. This type of arrangement is e specially advantageous when it is necessary to test individual seals or small numbers of seals of the given type. Since this testing apparatus is operative to stretch only a portion of the sealing surface of the seal, it can be used for seals of any size or shape.

The apparatus described above for carrying out the present invention is suitable for detecting flaws in the region of an edge or a narrow zone of a seal made of a highly resilient material. It should be understood that the present invention is not only applicable for testing seals but also, by appropriate modification of the apparatus, may be utilized in the annular detection of flaws in planer workpieces or seals of other shapes.

DESCRIPTION OF THE PREFERRED EMBODIMENTS

Figure 1:
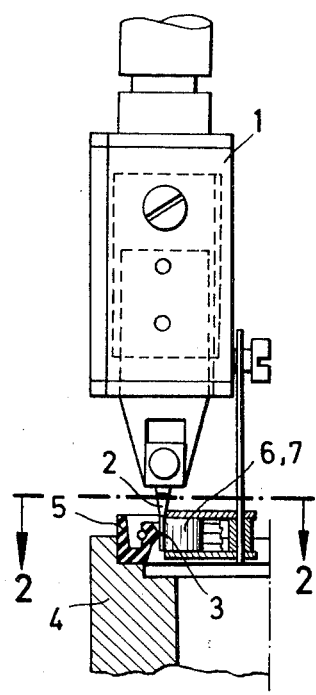
FIG. 1 is an elevational view of apparatus, according to an first preferred embodiment of the present invention, for detecting flaws in a shaft sealing ring. A portion of this sealing is shown in section.

The preferred embodiments of the apparatus according to the present invention will now be described in connection with the various FIGS. of the drawing. FIG. 1 illustrates a sensing head 1 having a feeler 2 in the form of a needle at its lower end. During the testing process, the feeler needle 2 is passed along the sealing tip edge 3 of a shaft sealing ring 5. While the sensing head 1 is held stationary, the sealing ring 5 is rotated about its axis by a holding fixture 4.

Figure 2:
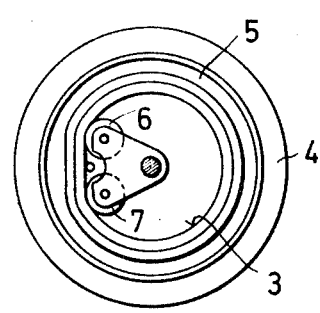
FIG. 2 is a cross-sectional view taken along the line II–II of FIG. 1.

As may be seen in top view in FIG. 2, the feeler needle 2 is arranged between two spreader rollers 6 and 7. These rollers are rotatable within a suitable mount that is rigidly connected to the sensing head 1. The rollers are pressed against the sealing lip edge 3 to be tested so that, at least in the region between the two rollers, the sealing lip edge will be caused to expand.

Figure 3:
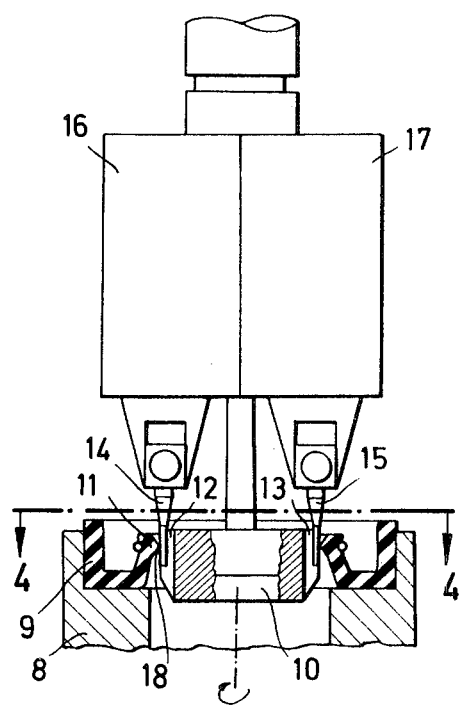
FIG. 3 is an elevational view of apparatus, according to a second preferred embodiment of the present invention, for detecting flaws in a shaft sealing ring.
Figure 4:
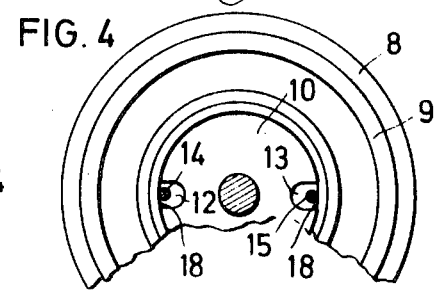
FIG. 4 is a cross-sectional view taken along the line IV–IV of FIG. 3.

In the embodiment illustrated in FIGS. 3 and 4 the shaft sealing ring 9 is held in a suitable holding fixture 8. Its sealing lips are stretched, around their entire circumferential extent 1 by a shaft stump 10. The diameter of the shaft stump 10 is made larger than the internal diameter of the sealing lips 11 in their unstretched state and, in particular, can be made equal to the nominal inner diameter of the sealing ring.

The shaft stump 10 is provided with two axially extending grooves 12 and 13. The feeler needles 14 and 15 of two sensing heads 16 and 17, arranged on opposite sides of the axis of the shaft stump, project into these axial grooves. When the sealing ring 9 is rotated, the two feeler needles 14 and 15 slide along its sealing lip edge 18. The feeler needles 14 and 15 press against the lip edge with differing pressures so as to simultaneously scan the sealing lip edge 18 for flaws of two differing sizes.

Figure 5:
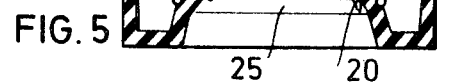
FIG. 5 is an elevational view of a modified version of the feeler tip portion of the apparatus of FIG. 3.

FIG. 5 illustrates a modified arrangement which may be used in the embodiment of the present invention shown in FIGS. 3 and 4. In this case, the tips 19 and 20 of the feeler needles 21 and 22 are bent into different configurations so that the entire sealing surface of the sealing ring will be tested at once. As is shown in the FIG., the tip 19 of the needle 21 is arranged to test the surface 23 immediately above the sealing ring lip edge 24 while the tip 20 of the needle 22 is arranged to test the sealing surface 25 immediately below the edge 24. It will be appreciated that the needles which are used in the apparatus according to the present invention may be arranged to come in contact with and test any number of different surface planes which, together, form all the sealing surfaces of the seal.

Although in FIG. 5 the sensing heads 26 and 27 are shown diametrically opposite each other with respect to the axis of rotation of the sealing ring, this fact is not a requirement of the apparatus according to the present invention. For example, the sensing heads can be so arranged that their respective needles 21 and 22 will lie immediately adjacent to each other around the circumference of the sealing surface of the sealing ring.

It will understood that the above description of the present invention is susceptible to various modifications, changes and adaptations.

We claim:

1. A method for testing for flaws on the sealing surface of a seal made of elastic material, wherein said seal is a shaft sealing ring and said sealing surface is formed by the lips of said sealing ring, comprising the steps of:
    a. stretching said lips to the nominal inner diameter of said sealing ring;
    b. passing a feeler over the stretched lips for obtaining a measurement which is a function of the variations in the friction between the feeler and said lips, in consequence of which the existence and location of flaws may be detected.

2. Apparatus for testing for flaws on the sealing surface of a seal made of elastic material, wherein said seal is a shaft sealing ring and said sealing surface is formed by the lips of said sealing ring, comprising in combination:
    a. means for stretching at least a portion of the sealing surface, said stretching means being a shaft stump having at least one axial groove in the circumferential surface thereof;
    b. feeler means including a feeler tip arranged in said at least one axial groove;
    c. means for passing said feeler means over said portion of the sealing surface; and
    d. means, connected to said feeler means, for sensing variations in friction between said feeler means and said portion of said sealing surface.

3. The apparatus defined in claim 2, wherein said shaft stump has the same diameter as the nominal inner diameter of said sealing ring.

4. The apparatus defined in claim 2, wherein said shaft stump has a plurality of axial grooves distributed around its circumference, and said feeler means includes a feeler tip arranged in each of said grooves.

5. The apparatus defined in claim 4, wherein each of said feeler tips is arranged to sense a different plane of said sealing surface.